United States Patent
Milne et al.

(10) Patent No.: US 7,505,610 B2
(45) Date of Patent: Mar. 17, 2009

(54) INTEGRATED PORTABLE IDENTIFICATION AND VERIFICATION DEVICE

(75) Inventors: Donald A. Milne, Fairfax, VA (US); Tianlong Chen, Gaithersburg, MD (US)

(73) Assignee: Intelitroc Inc., Germantown, MD (US)

( * ) Notice: Subject to any disclaimer, the term of this patent is extended or adjusted under 35 U.S.C. 154(b) by 922 days.

(21) Appl. No.: 10/635,516

(22) Filed: Aug. 7, 2003

(65) Prior Publication Data

US 2005/0033452 A1 Feb. 10, 2005

(51) Int. Cl.
*G06K 9/00* (2006.01)
(52) U.S. Cl. ..................... 382/116; 382/124
(58) Field of Classification Search ........... 382/124, 382/116, 126, 127, 312, 125; 720/718; 713/186; 42/70.11; 235/380, 382, 487, 492; 365/201, 365/203, 222, 228, 205, 190, 189.09
See application file for complete search history.

(56) References Cited

U.S. PATENT DOCUMENTS

| | | | | |
|---|---|---|---|---|
| 5,467,403 | A * | 11/1995 | Fishbine et al. | 382/116 |
| 6,317,544 | B1 * | 11/2001 | Diehl et al. | 385/115 |
| 6,320,974 | B1 * | 11/2001 | Glaze et al. | 382/115 |
| 6,335,688 | B1 * | 1/2002 | Sweatte | 340/573.1 |
| 6,690,997 | B2 * | 2/2004 | Rivalto | 700/237 |
| 6,801,907 | B1 * | 10/2004 | Zagami | 707/3 |
| 6,973,203 | B1 * | 12/2005 | Lauper et al. | 382/117 |

\* cited by examiner

*Primary Examiner*—Sheela C Chawan
(74) *Attorney, Agent, or Firm*—24IP Law Group; Timothy R. DeWitt

(57) ABSTRACT

An portable integrated identification and verification system is disclosed. The station includes multiple devices integrated for identifying or verifying the identity of a person. The multiple devices, which may include a camera, a document scanner, and a fingerprint scanner, are mounted in a housing along with a computing device.

22 Claims, 9 Drawing Sheets

INTEGRATED PORTABLE IDENTIFICATION AND VERIFICATION DEVICE

STATEMENT REGARDING FEDERALLY SPONSORED RESEARCH OR DEVELOPMENT

Not applicable.

CROSS-REFERENCE TO RELATED APPLICATIONS

Memory-Resident Database Management System and Implementation Thereof; Ser. No. 10/347,678; Filed on Jan. 22, 2003; Inventors: Tianlong Chen, Jonathan Vu.

Distributed Memory Computing Environment and Implementation Thereof; application Ser. No. 10/347,677, Filed on Jan. 22, 2003; Inventors: Tianlong Chen, Jonathan Vu, Yingbin Wang.

Invariant Memory Page Pool and Implementation Thereof; Filed on Apr. 30, 2003; Inventors: Tianlong Chen, Yingbin Wang, Yinong Wei.

Central Linked List Data Structure and Methods of Use; Filed Jul. 9, 2002, Provisional Application Ser. No. 60/394,257; Inventor: Jonathan Vu.

The above-referenced applications are hereby incorporated herein by reference in their entirety.

FIELD OF THE INVENTION

The present invention relates to a portable integrated system for identification and/or verification of documents or other identification materials, fingerprints or other physical characteristics, and facial images.

BACKGROUND OF THE INVENTION

Traditionally, facial recognition, fingerprint scanning and document identification devices are used separately, and are often used in fixed locations such as offices. It would be very convenient to integrate such devices to improve the accuracy of identification or verification. It is also more desirable to make the combined device portable to give users, who are mainly law enforcement officers, faster response time in the war against crime or terror.

SUMMARY OF THE INVENTION

The present invention has been made in view of the above circumstances. The present invention has an aspect of providing an integrated identification and verification station or device having at least facial recognition, document identification and verification functionality, and optionally fingerprint identification and verification capability in one combined device.

Still another aspect of the present invention is to provide an integrated identification and verification station having a control computing device with a display component to generate and display separate or combined reports of facial recognition, document scanning, and fingerprinting, and to give the user a graphical interface for administration and operation.

Still another aspect of the present invention is for the control computing device optionally to connect by wireless or wire line to query a remote information server for other information.

Still another aspect of the present invention is that the integrated identification and verification station is portable.

Still other aspects, features, and advantages of the present invention are readily apparent from the following detailed description, simply by illustrating preferable embodiments and implementations. The present invention is also capable of other and different embodiments, and its several details can be modified in various respects, all without departing from the spirit and scope of the present invention. Accordingly, the drawings and descriptions are to be regarded as illustration in nature, and not as restrictive.

BRIEF DESCRIPTION OF THE DRAWINGS

The accompanying drawings, which are incorporated in and constitute a part of this specification illustrate some embodiments of the invention and, together with the description, serve to explain the objects, advantages, and principles of the invention. To facilitate the description, the preferred embodiment of the invention will be referred to herein as the "integrated identification and verification station". In the drawings.

DESCRIPTION OF THE PREFERRED EMBODIMENT

The present invention relates to an integrated identification and verification station. A preferred embodiment of the invention has the functionality of at least two types of identification and verification, such as facial recognition, fingerprint identification and verification, and document identification and verification. Other types of identification or verification may be used in addition to or in place of one or more of the facial recognition, fingerprint identification and verification, and document identification or verification. A computer inside the integrated identification and verification station provides the functionality of administration, operation and reporting.

Figure 1:
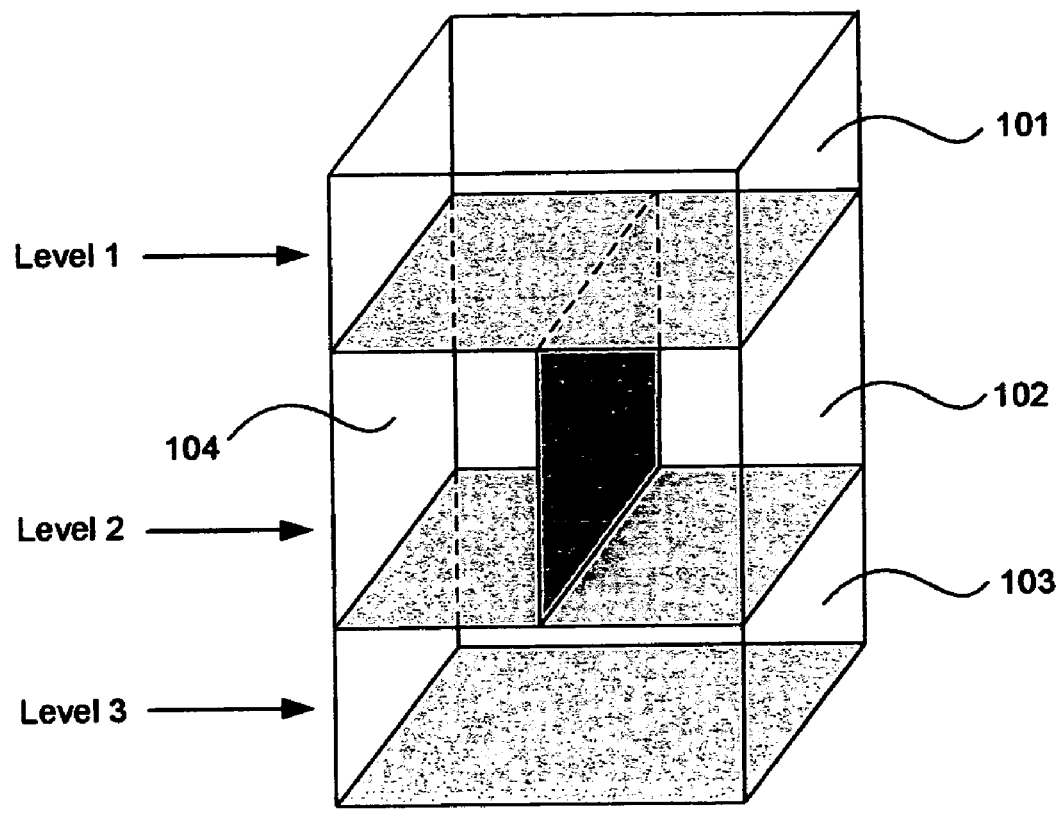
FIG. 1 is a transparent view of an empty integrated identification and verification station housing or box in accordance with a preferred embodiment of the present invention. The integrated identification and verification station housing has three levels, level 1 for hosting a camera preferably but optionally with pan, tilt and zoom capability; level 2 being separated into two parts, one of them for hosting a document scanner, the other for hosting a fingerprint scanner; and level 3 for hosting a computer with a display.

Referring to FIG. 1, there is illustrated a transparent view of an empty integrated identification and verification station housing that has three levels. The top level has one compartment 101, the middle level has two compartments 102, 104, and the bottom level has one compartment 103. The compartment 101 at the top level hosts a facial recognition device such as a camera or cameras, preferably with Pan, Tilt and Zoom capability as further showing in FIG. 5. The compartment 104 at the left side of the middle level hosts a scanning device such as a document, bar code, or other scanner, In the preferred embodiment, a document scanner is used in compartment 104 as further shown in FIG. 3. The compartment 102 on the right at level 2 hosts a physical identification device such as a fingerprint or eye scanner. In a preferred embodiment, a fingerprint scanner is used in compartment 102, as further showing in FIG. 4. The bottom compartment 103 at level 3 hosts a computer with folding display device as further showing in FIG. 2. Other arrangements of a computer and display may be used. Although this arrangement of the various components to be integrated is presently preferred, other physical arrangements of the components certainly would be understood by those of skill in the art.

Figure 2:
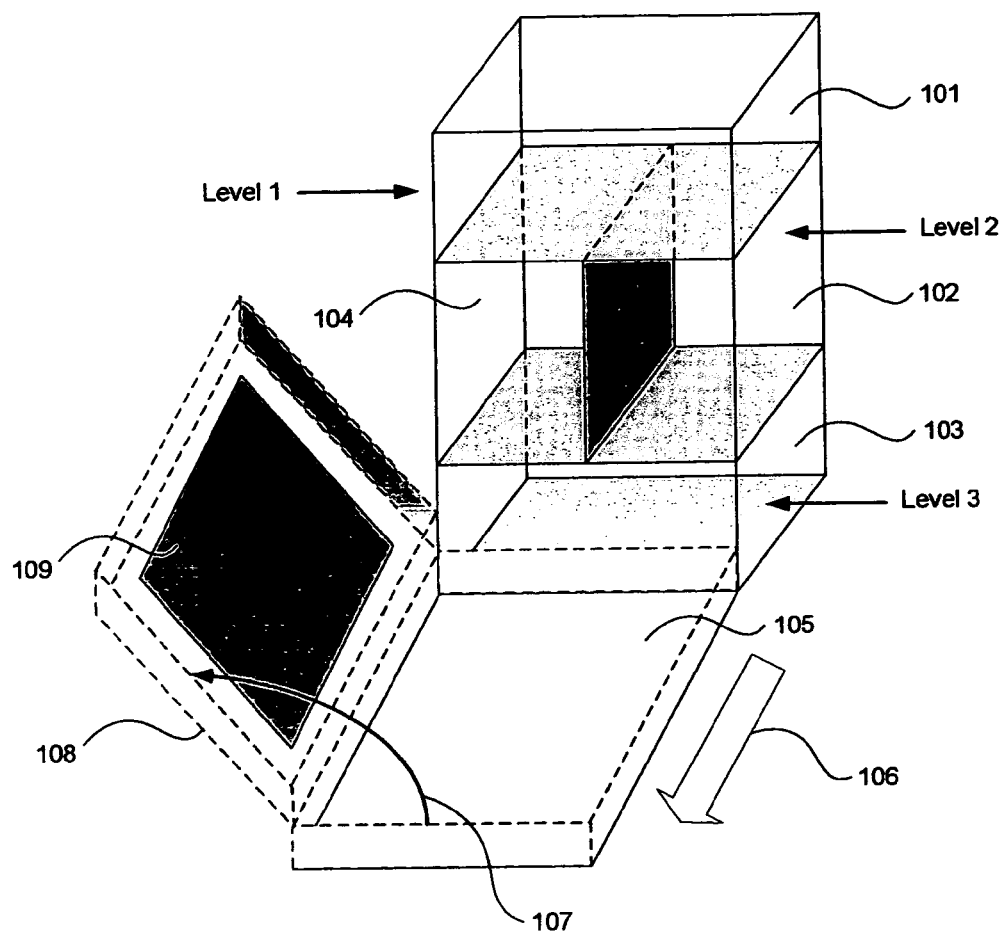
FIG. 2 is a transparent view of a conceptual integrated identification and verification station housing in accordance with a preferred embodiment of the present invention with the computer pulled out from the level 3 of integrated identification and verification station housing in accordance with the present invention.

Referring to FIG. 2, the computer 105 is removably placed or mounted in compartment 103. The computer 105 may simply be placed into the compartment 103 in a manner in which is latches in only when not it use, or it may be mount to the housing by means of a drawer. May variations of mounting or placing the computer into the housing are possible. In FIG. 2, the computer 105 has a display that folds down, such as on a laptop computer. Other variations of the display and computer, such as the display being mounted on the computer in the manner of a tablet PC or being mounted to the housing separate from the computer are possible and would be readily apparent from this specification to those skilled in the art. In FIG. 2, computer 105 is pulled out in the direction 106 from compartment 103 for a user's operation. A display device 108 with display screen 109 is attached with the computer 105 and is shown opened 107. The display device 108 can be setup to be attached in other ways such as be attached to the integrated identification and verification station directly. FIG. 2 shows the computer is pulled out from a back face of the integrated identification and verification station housing, it can be setup in other directions too.

Figure 3:
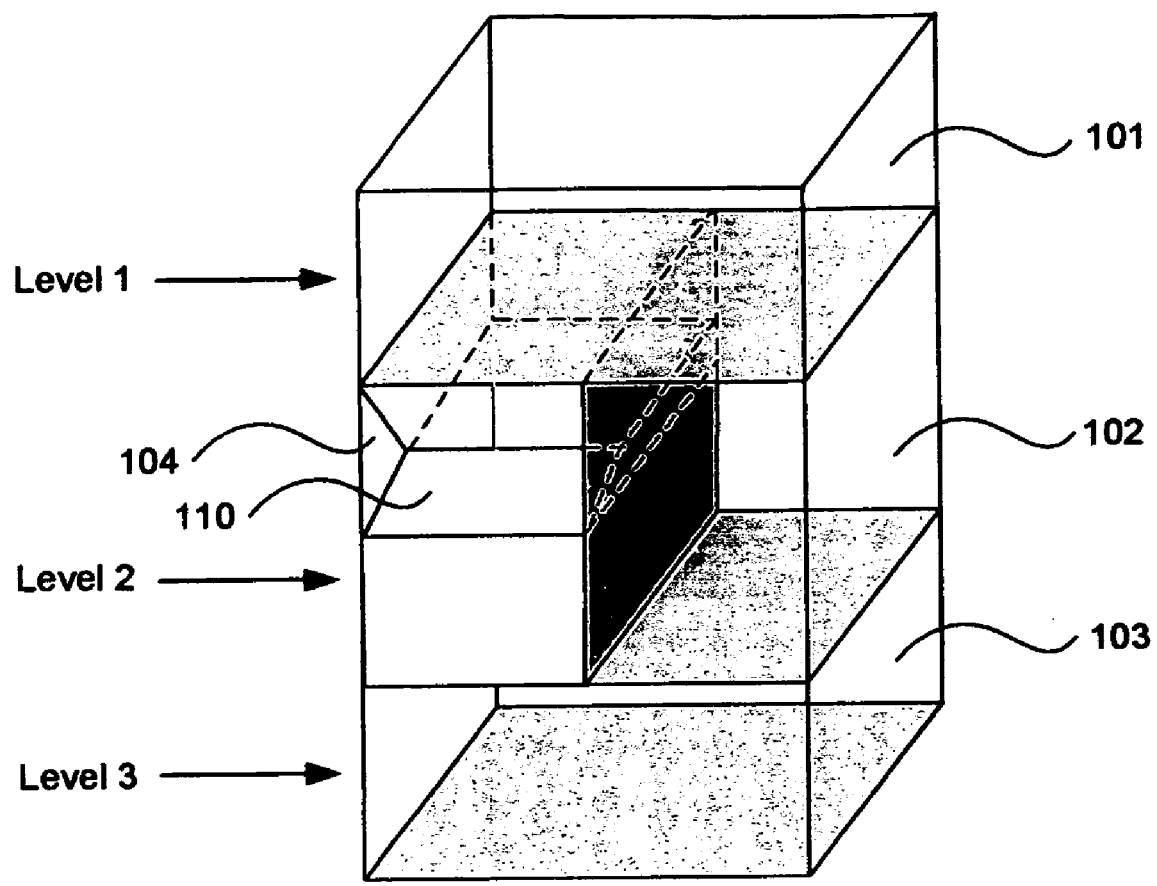
FIG. 3 is a transparent view of a conceptual integrated identification and verification station housing in accordance with a preferred embodiment of the present invention with a document scanning device sitting in one part of level 2 inside the integrated identification and verification station.
Figure 4:
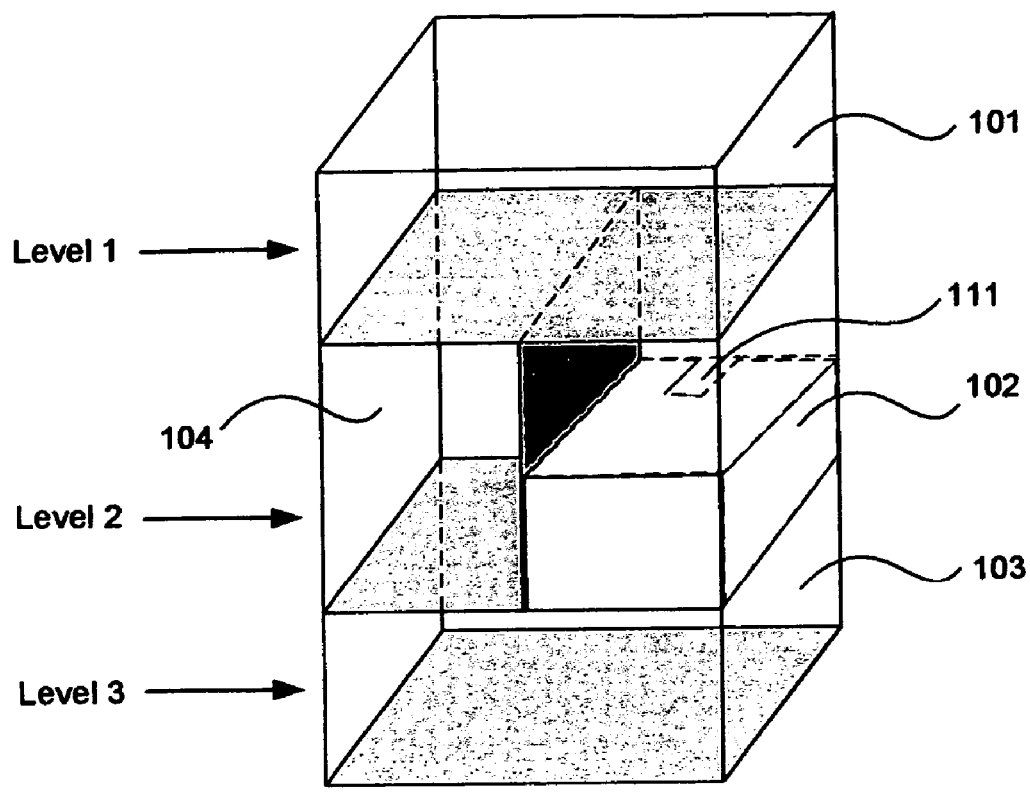
FIG. 4 is a transparent view of a conceptual integrated identification and verification station housing in accordance with a preferred embodiment of the present invention with a fingerprint device sitting in one part of level 2 inside the integrated identification and verification station.

Referring to FIG. 3, a document scanner 110 sits in the left compartment 104 of Level 2 facing the back of the housing. In a preferred embodiment, the document scanner is a Passport scanner. Other types of scanners, such as a bar code scanner, may be used, depending on the type of document or identifying material to be scanned. Referring to FIG. 4, a fingerprint scanner 111 sits in the right cubic 102 facing front.

Figure 5:
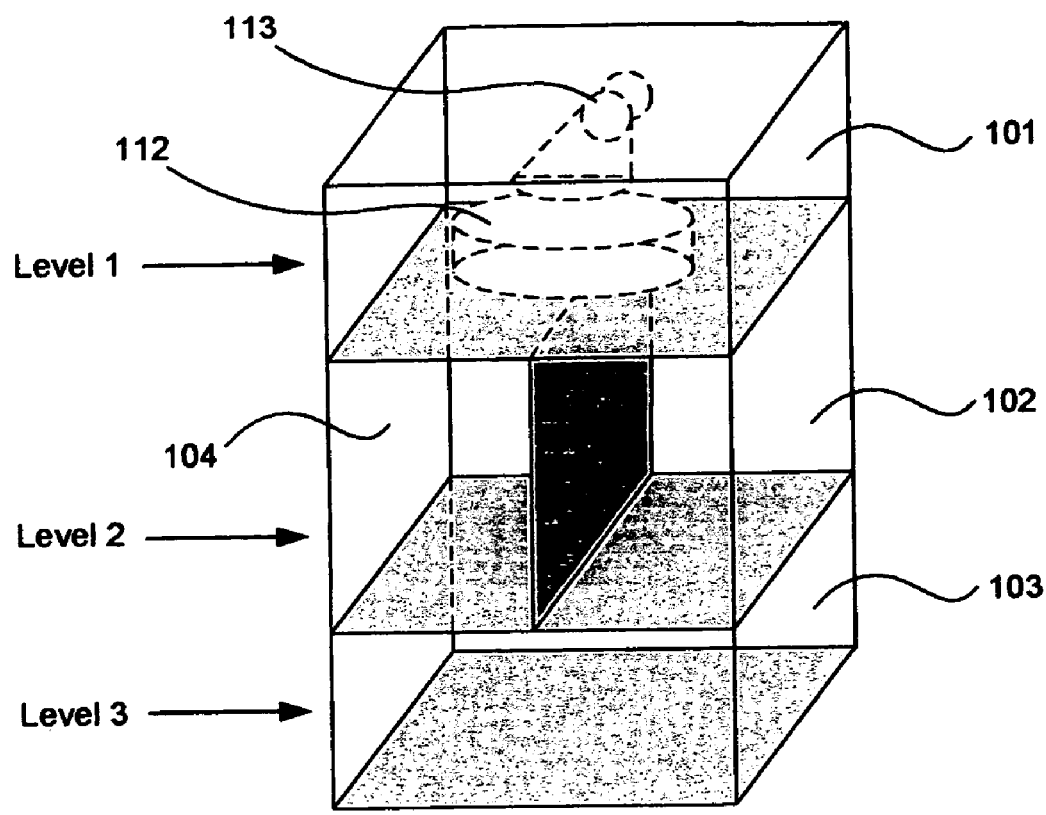
FIG. 5 is a transparent view of a conceptual integrated identification and verification station housing in accordance with a preferred embodiment of the present invention with a Camera with Pan, Tilt and Zoom sitting in level 1 inside the integrated identification and verification station.

Referring to FIG. 5, a camera 113 with Pan, Tilt and Zoom 112 capabilities sits in the top cubic room 101 facing front. The camera is used for taking one or more pictures of a person for further facial recognition. Optionally the camera can be detached from the integrated identification and verification station to provide flexible picture taking, but it will still be connected via wired or wireless means with the computing device inside the integrated identification and verification station.

Figure 8:
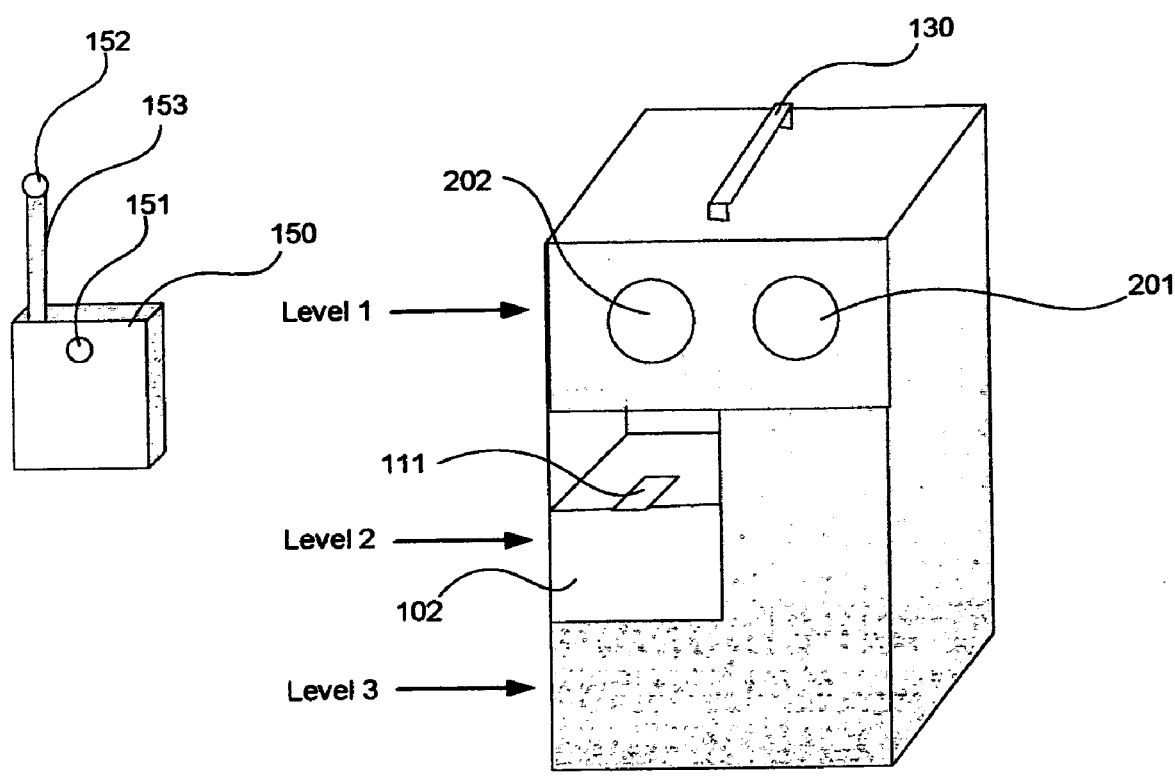
FIG. 8 illustrates a front view of a conceptual integrated identification and verification station housing in accordance with a preferred embodiment of the present invention with a camera hole and an extra light hole at level 1 and fingerprint scanner window at level 2 in accordance with the present invention.

Referring to FIG. 8, optionally a camera 151 can be located in a separated handheld computing device 150 to achieve the function of taking picture of a person. An extra light 152 can be attached 153 (such as a clip) to the handheld computing device 150 for lighting in picture taking. After picture taking, the picture can either be downloaded to the computing device in the integrated identification and verification station housing by wired or wireless network.

Figure 6:
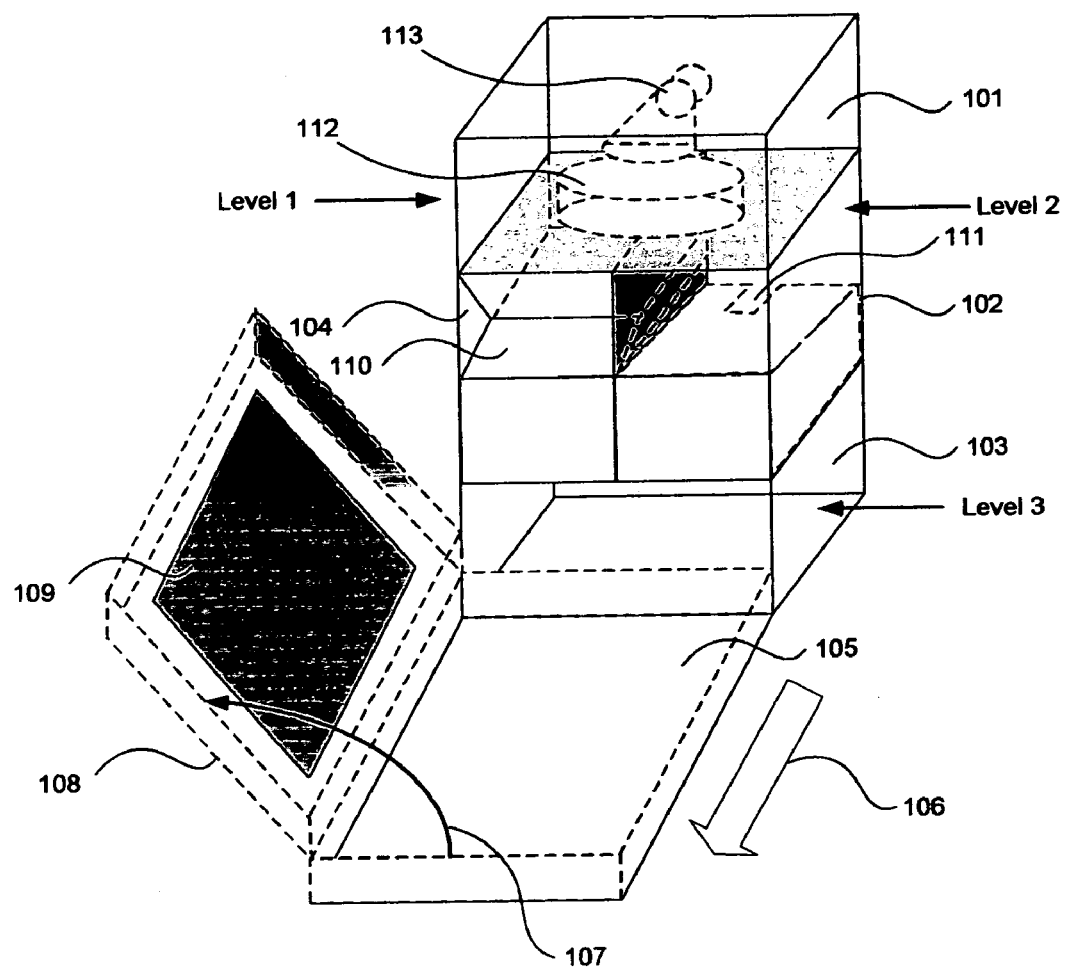
FIG. 6 is a transparent view of a conceptual integrated identification and verification station housing in accordance with a preferred embodiment of the present invention with components in each level of the integrated identification and verification station housing, including a pulled-out computer and its display device at level 3, a document scanner and a fingerprint scanner at level 2 facing opposite direction, a camera at level 1 in accordance with the present invention.

Referring to FIG. 6, an integrated identification and verification station housing hosts a computer 105 with display device 108, a camera 113, a document scanner 110 and a fingerprint scanner 111. In FIG. 6, the computer and display are pulled out of the housing for use. In the embodiment shown in FIG. 6, the computer 105 and display 108 pulls out of the back side of the housing while the camera 113 faces the front of the housing.

Figure 7:
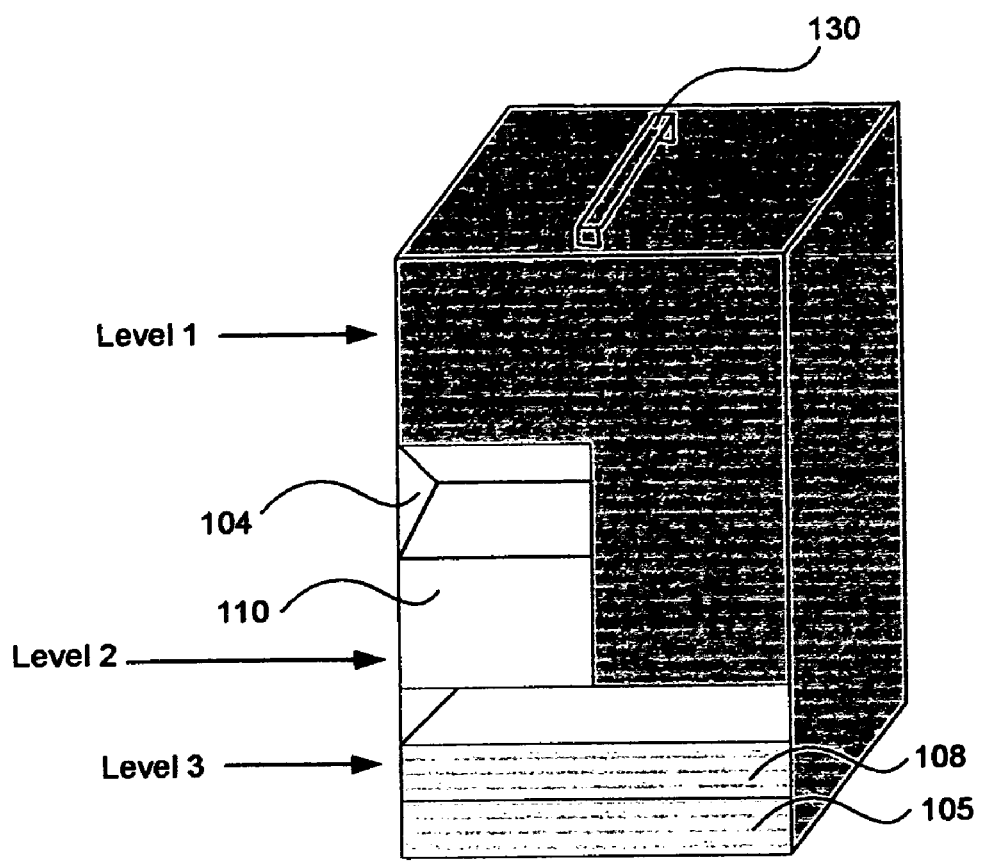
FIG. 7 illustrates a back view of a conceptual integrated identification and verification station housing in accordance with a preferred embodiment of the present invention with a computer and its display device inside at level 3 and document scanner facing back at level 2 in accordance with the present invention.

Referring to FIG. 7, the back face of an embodiment of an integrated identification and verification station housing is shown. The computer 105 and its display device 108 are sitting inside the integrated identification and verification station housing, the document scanner 110 has a window 104 for scanning a document. Those skilled in the art would understanding the other means, such as a slot or feeder could be used in the invention for inserting a document to be scanned.

Referring to FIG. 8, a front-faced integrated identification and verification station housing is shown in non-transparent way, the level 1 has a camera hole 201 for a camera lens to view through, an optional lighting hole 202 with an extra light providing extra light in picture taking, and the fingerprint scanner 111 has a window for customer to insert a finger or fingers for scanning.

Figure 9:
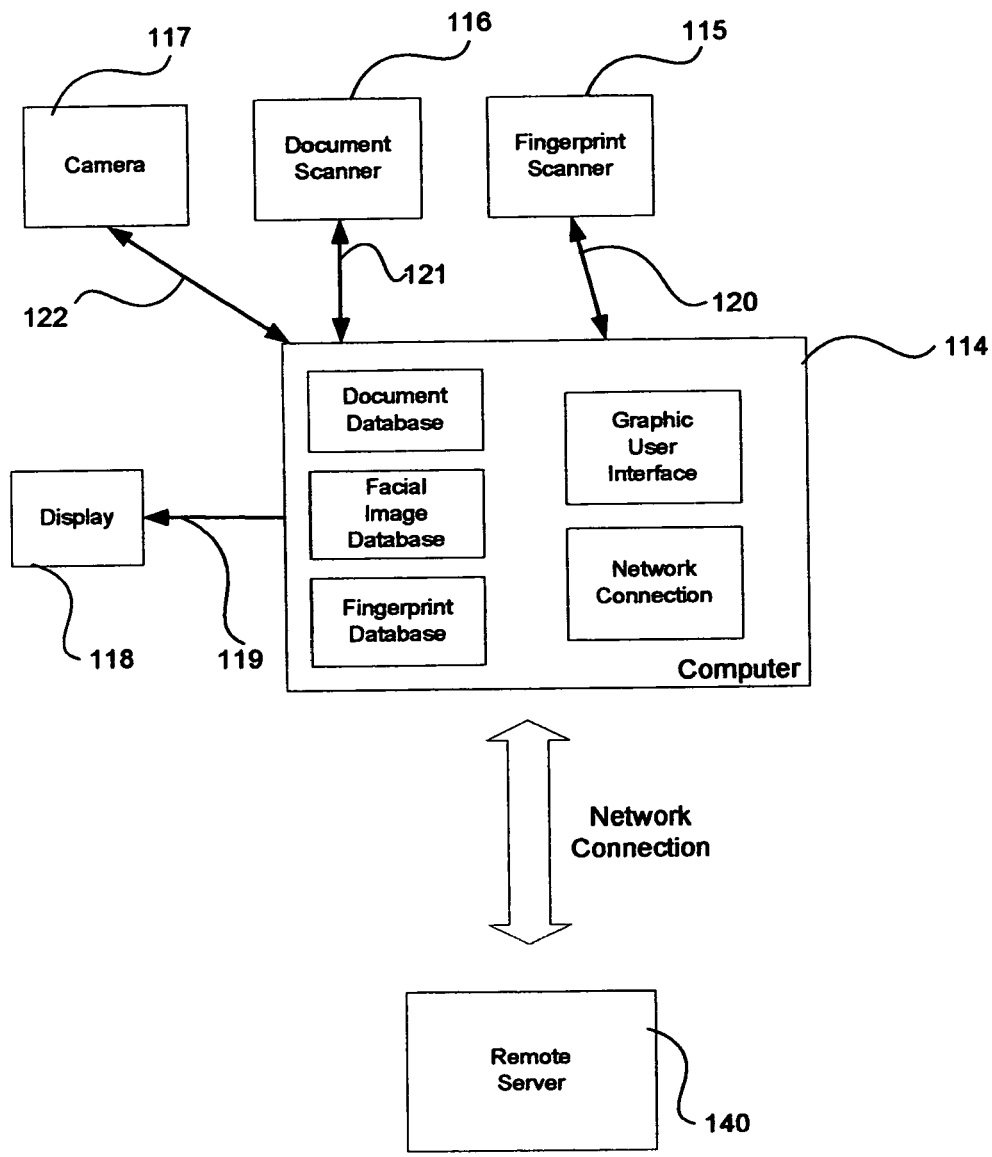
FIG. 9 illustrates functional block diagram of an integrated identification and verification station in accordance with a referred embodiment of the present invention.

Referring to FIG. 9, a functional diagram shows computer 114 is connected with all devices 115, 116, 117 and 118 by either wireless or wired network, serial port, USB, IEEE 1394 Firewire, or other connection, depending on the specific components used. The computer 114 serves as an administration, control and report center, and outputs to display device 118. The computer 114 may have a printer port to output for direct printing. It also has connections for a wireless or wired network to provide connection with remote server or system for other information query.

Still referring to FIG. 9, the computer 114 provides a graphic user interface (GUI) to the document scanner 116. The document scanner 116 provides document scanning functionality, and output image(s) or other information of the scanned document to the computer 114. The computer 114 uses a document database in the computer 114 (or on the network) in connection with extracting various information from the scanned document, and it further uses the document database to identify the type and other information of the document scanned and verify the document. If a document includes a human face photo or template encoded from a human face photo, the face photo or template can be captured for further facial recognition. The result can be displayed on the display device 118. If a document includes a human fingerprint image or its encoded template, the fingerprint image and its encoded template can be captured for further fingerprint identification.

Still referring to FIG. 9, the computer 114 provides a graphic user interface to the fingerprint scanner 115, the fingerprint scanner 115 will provide fingerprint scanning capability and output an image or its encoded template. In operation, a person's finger is put on fingerprint scanner 115 and a fingerprint image or its encoded template is output to the computer 114, and the computer 114 uses the image or its encoded template (the image or its encoded template can also be captured from the fingerprint image or encoded template on document by document scanner) to further query a fingerprint database inside the computer 114 or query through the computer 114 wireless or wired network connection to a remote server 140 for a fingerprint database, to get the identity and information of the person with scanned fingerprint if the person's fingerprint is in the fingerprint database, or to get no match if the person's fingerprint is not in the fingerprint database. The query result can be displayed on the display device 118.

Still referring to FIG. 9, the computer 114 provides a graphic user interface to the camera 117, camera can take live pictures of a person, the computer further uses the captured pictures to search through a image database inside the computer for facial recognition or sends a facial recognition search query with the captured pictures through computer 114 network connection to a remote image database in a remote server 140 for facial identification. The query result can be displayed on the display device 118. The result at least includes several possible matches and matching percentage associated with each match or no match at all.

Still referring to FIG. 9, the computer will further provide administration functionality to all devices, including but not limited to optional setting up network connection with remote server, setting up various parameter of in-housing devices, setting up camera Pan, Tilt and Zoom functions, and operation control of each device in the integrated identification and verification station housing such as starting, stopping, restarting and status checking, and generating report for search and query result.

In order for the integrated identification and verification station to be conveniently portable, an in-housing power supply is provided with limited power supply for each device, or optionally a power line is provided to external power supply. The computer inside integrated identification and verification station can monitor the power level of the internal power supply, when whole system is idle for certain time, the computer will automatically temporarily shut down the whole system for saving the power. An internal power supply can be a rechargeable battery.

Referring to FIG. 7 or FIG. 8, a handle 130 is attached on top of the integrated identification and verification station housing for people to easily carry the integrated identification and verification station housing around. The handle can put on sides of the housing too.

Referring to FIG. 7 or FIG. 8, one such integrated identification and verification station housing is 13 inch wide, 15 inch long and 29 inch high. It is possible to make it smaller.

Using the portable integrated identification and verification system described above, one may verify the identity of a person using a variety of methods incorporating the various components of the system. For example, one may use the document scanner to scan a facial image or a fingerprint image from an identification document and compare the scanned facial or fingerprint image to a database of facial images or fingerprint images. One further could use the camera to take a digital facial image of a person and compare that facial image to both a facial image scanned from an identification document and a facial image database. One further could use the fingerprint scanner to scan a fingerprint of a person and compare that scanned fingerprint both to a fingerprint image or template scanned from an identification document and to a fingerprint image database. Many different methods of verifying the identity of a person using the system described above would be apparent to one skilled in the art.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. An identification system comprising:
   a housing;
   a document scanner mounted in said housing and connected to a computing device;
   a camera mounted in said housing and connected to said computing device; and
   a fingerprint scanner mounted to said housing and connected to said computing device;
   wherein said housing comprises:
      an outer shell;
      a first compartment for housing said document scanner;
      a second compartment for housing said camera; and
      a third compartment for housing said fingerprint scanner; and
   wherein said document scanner scans documents and supplies images of said documents to said computing device, said camera supplies facial images to said computing device, and said fingerprint scanner provides fingerprint images to said computing device.

2. An identification system according to claim 1 wherein said computing device is removably mounted to said housing.

3. An identification system according to claim 1 wherein said identification system is portable.

4. An identification system according to claim 1 further comprising a display connected to said computing device.

5. An identification system according to claim 1 wherein said camera has at least one of pan, zoom, and tilt capabilities.

6. An identification system according to claim 1 wherein said housing further comprises:
   a compartment for housing said computing device.

7. An identification system according to claim 1 wherein said housing further comprises a handle attached to said outer shell.

8. An identification system according to claim 1 wherein said computing device comprises:
   a memory;
   a document identification database stored in said computing device, said document identification database comprising standard document information; and a processor;

wherein said processor verifies a document image received from said document scanner against said standard document information in said document identification database.

9. An identification system according to claim 1 further comprising a power supply.

10. An identification system according to claim 9 wherein said power supply comprises an internal power supply.

11. An identification system according to claim 10 wherein said internal power supply comprises a battery.

12. An identification system according to claim 11 wherein said battery is rechargeable.

13. An identification system according to claim 9 wherein said power supply comprises an external power supply.

14. An identification system according to claim 1 wherein said identification system is portable.

15. An identification system according to claim 1 further comprising a light for providing lighting for said camera.

16. An identification system according to claim 1 wherein said camera is mounted on a separate handheld computing device having a CPU, memory and operating system.

17. An identification system according to claim 16 further comprising a wireless connection between said handheld computing device and said computing device.

18. An identification system according to claim 16 wherein said camera takes pictures and transfers said pictures to said computing device.

19. An identification system according to claim 18 wherein said transfer can be done through a wireless connection.

20. An identification system according to claim 18 wherein said transfer can be done through a wire line.

21. An identification system according to claim 16 wherein there is a light attached to said handheld device for lighting for said camera on said handheld device.

22. An integrated device system according to claim 1 wherein said camera can be detached from said integrated device system with connection with said computing device.

* * * * *